L. N. PRUDHOMME.
MACHINE FOR DESTROYING COTTON BOLL WEEVILS.
APPLICATION FILED MAY 17, 1909.
946,561.
Patented Jan. 18, 1910.
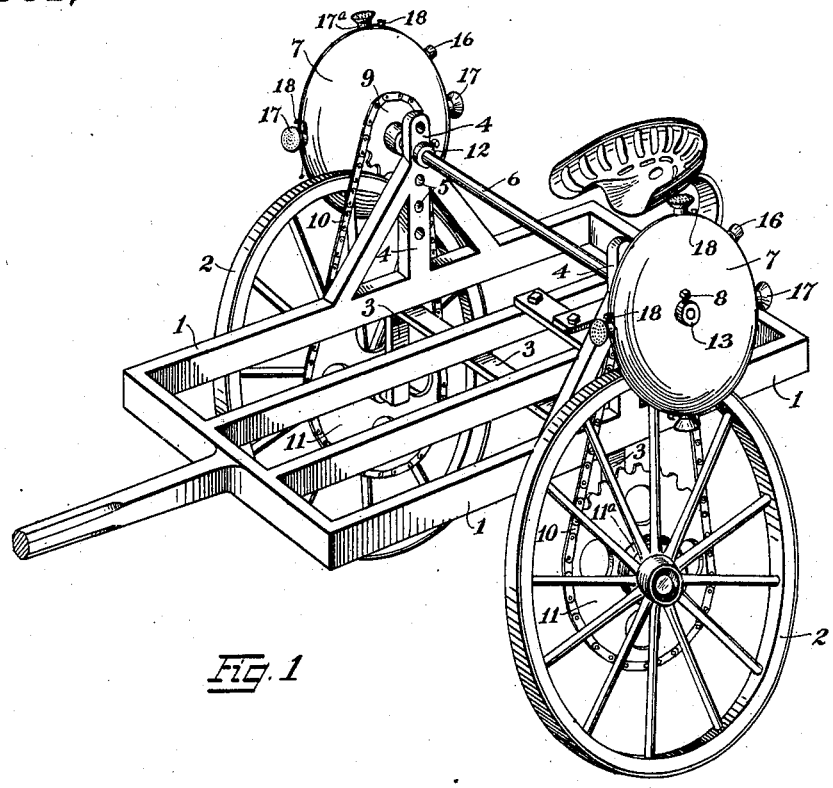
Fig. 1
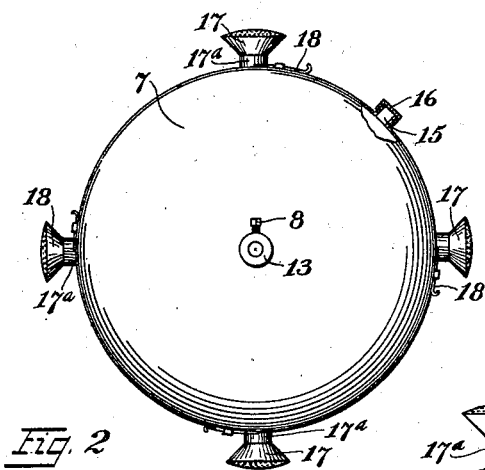
Fig. 2
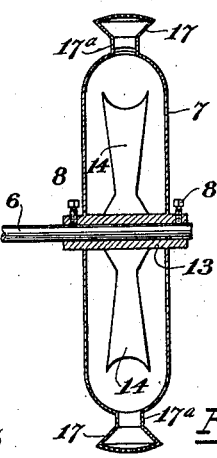
Fig. 3
Fig. 4
Witnesses:
F. C. Valentine
M. G. Rinehart
Inventor:
Louis Narcisse Prudhomme
by Obed C. Billman
his attorney.

UNITED STATES PATENT OFFICE.

LOUIS NARCISSE PRUDHOMME, OF BERMUDA, LOUISIANA.

MACHINE FOR DESTROYING COTTON-BOLL WEEVILS.

946,561.

Specification of Letters Patent. Patented Jan. 18, 1910.

Application filed May 17, 1909. Serial No. 496,362.

*To all whom it may concern:*

Be it known that I, LOUIS NARCISSE PRUD-HOMME, a citizen of the United States, residing at Bermuda, in the parish of Natchitoches and State of Louisiana, have invented certain new and useful Improvements in Machines for Destroying Cotton - Boll Weevils, of which the following is a specification.

My invention relates to improvements in machines for destroying cotton boll-weevils, the primary object of the invention being to provide means whereby the poison, in either powdered or liquid form, may be properly and expeditiously distributed upon the rows of growing cotton stalks during the various stages of growth subjected to the ravages of this insect pest.

The invention relates more particularly to the construction of the poison containing and distributing mechanism whereby the same may be adjusted vertically on the carriage to accommodate the same to the height of the cotton stalks during the various stages of growth and means for regulating the distribution of the poison to meet various conditions.

With the above mentioned ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a perspective view of a machine constructed in accordance with my invention. Fig. 2, a detail side elevation of one of the improved distributing container - drums. Fig. 3, a cross sectional view of the same, showing the position and arrangement of the internal agitators. Fig. 4, a detail view of a modified form of nozzle attachment.

Similar numerals of reference designate like parts throughout all the figures of the drawings.

The improved machine comprises a suitable supporting carriage or frame 1, carried upon a pair of carriage wheels 2, said carriage wheels 2, in the present instance, being mounted upon a transversely disposed yoke or arched axle member 3. The side members of the carriage frame 1, are provided with upwardly extending standards 4, provided with a series of bearing openings 5, for receiving and containing the transversely disposed overhanging driving shaft 6. The driving shaft 6, is provided with a plurality of poison distributing container-drums 7, said container drums being adapted to be adjusted upon the driving shaft 6, to conform to the distance between the rows of cotton stalks by being adjustably mounted and secured thereon by means of adjusting bolts 8.

The driving shaft 6, is provided, in the present instance, with a pair of sprocket wheels 9, carrying a pair of sprocket chains 10, passing over a pair of sprocket wheels 11, beneath. The sprocket driving wheels 11, are carried upon and secured to the inner sides of the carriage wheels 2, by means of ratchet mechanism (not shown) in a well known manner, said ratchet mechanism being mounted within a casing or housing 11ᵃ, as shown, whereby motion is independently transmitted from the several carriage wheels to the driving shaft, and providing for the turning of the carriage to meet the demands of actual service.

The driving shaft 6, together with the attached container drums 7, are adapted to be adjusted vertically upon the carriage to conform to the height of the rows of cotton stalks beneath, by passing the driving shaft through suitable bearing openings 5, in the standards, said shaft when so adjusted being secured as against lateral displacement by means of bearing collars 12. The length of the sprocket chains 10, may be correspondingly regulated, it being evident that, if desired, motion may be transmitted to the driving shaft 6, by a single sprocket chain and pair of sprocket wheels.

The machine may be drawn by one or two horses or mules and, if desired, additional container drums may be mounted upon the driving shaft 6, and the frame of the machine correspondingly widened.

In the embodiment of the invention shown in Fig. 1, of the drawings, two rows of cotton stalks are adapted to be simultaneously treated, the carriage wheels being adapted to pass just within and between the two adjacent rows of cotton stalks, the container drums 7, projecting or extending out laterally on the outer sides of the carriage wheels so as to distribute the poison directly to the rows of cotton stalks passing beneath. Each distributing container drum comprises a hollow disk-shaped body or canteen shaped portion provided with an axle sleeve 13, and as a means for agitating the poison within the containers each axle sleeve is provided with radially extending agitator arms or wings 14. The poison is adapted to be introduced into the container drums 7, through an inlet opening 15, normally closed by means of a screw cap 16. Each container drum is provided about its periphery or outer rim portion with a plurality or series of radially extending spraying or distributing nozzles 17, the amount of material distributed through said nozzles being adapted to be regulated by means of the slidably mounted valve plates 18, carried upon the periphery of the container drums and adapted to open or close the openings of the neck portions 17$^a$, of the distributing nozzles. The distribution of the poison may also be regulated by regulating the size of the openings in the nozzles, and, if desired, the nozzles 17, may be removably secured and attached as indicated in Fig. 4, by screw threading the same upon separately formed neck portions 17$^b$. In such instance nozzles of varying sizes may be attached and brought into service to meet the demands of the occasion.

From the foregoing description, taken in connection with the accompanying drawings, the operation and advantages of my invention will be readily understood.

Having thus described my invention, what I claim and desire to secure by Letters Patent is,—

1. In a machine of the class described, a distributing container-drum comprising a hollow disk-shaped body provided with an axle-sleeve and a plurality of valved peripherally-arranged nozzles, and agitators carried by said axle-sleeve within said hollow disk-shaped body.

2. In a machine of the class described, a distributing container-drum comprising a canteen-shaped body provided with an axle-sleeve and a plurality of peripherally arranged nozzle-necks, a plurality of nozzles threaded on said nozzle-necks, slide valves adapted to open and close the outlet openings of said nozzle-necks, and agitator wings carried by said axle-sleeve within said container-drum.

3. In a machine of the class described, a supporting frame mounted on vehicle wheels and carrying an overhanging driving shaft, container drums adjustably mounted on said driving shaft and provided with a plurality of valved peripheral nozzles, agitators mounted within said container-drums, and means for revolving said overhanging driving shaft from one of said vehicle wheels.

In testimony whereof I have affixed my signature, in presence of two witnesses.

LOUIS NARCISSE PRUDHOMME.

Witnesses:
PETER J. GIBSON,
M. N. DISMUKES.